United States Patent [19]

Whidden

[11] 4,264,978
[45] Apr. 28, 1981

[54] DEVICE FOR LOCATING AUDIO SURVEILLANCE APPARATUS

[76] Inventor: Glenn H. Whidden, 13214 L'Enfant Dr., Oxon Hill, Md. 20022

[21] Appl. No.: 84,561

[22] Filed: Oct. 15, 1979

[51] Int. Cl.³ .................. H04B 7/14; H04B 11/00; H04B 17/00
[52] U.S. Cl. .................. 455/67; 343/13 R; 367/2; 367/127; 455/228
[58] Field of Search .......... 455/11, 9, 15, 18, 20, 455/67, 84, 89, 228, 226; 343/6 R, 13 R; 367/2, 128, 127

[56] References Cited

U.S. PATENT DOCUMENTS

| | | | |
|---|---|---|---|
| 2,568,926 | 9/1951 | Moran, Jr. | 367/2 |
| 2,910,665 | 10/1959 | Hawkins | 367/6 |
| 3,181,154 | 4/1965 | Henne | 343/13 R |
| 3,380,049 | 4/1968 | Webb | 343/6.5 R |
| 3,939,420 | 2/1976 | Risberg et al. | 455/228 |
| 4,127,817 | 11/1978 | Bell, Jr. | 455/67 |

*Primary Examiner*—Marc E. Bookbinder

[57] ABSTRACT

A pulse generator is provided for transmitting an acoustic pulse which is sensed by an audio surveillance device and retransmitted as modulated electromagnetic information. Associated with the pulse generator is a timing arrangement and display. The timer is triggered into operation by the generation of the acoustic pulse. The operating speed of the timer is established to be a function of the speed of sound. Means are provided to stop the timer upon receipt of a demodulated signal representative of the retransmitted pulse whereby the display indicates the distance to the surveillance device.

7 Claims, 2 Drawing Figures

DEVICE FOR LOCATING AUDIO SURVEILLANCE APPARATUS

BACKGROUND OF THE INVENTION

With the advent of microminiaturization of electronic components and the improvement in performance of such elements, the development and availability of small sophisticated audio surveillance devices has dramatically increased. The widespread use of such devices poses a formidable problem in maintaining the secrecy of sensitive information.

To combat the problem, a number of products have been designed to detect the presence of audio surveillance devices. However, such equipment generally is limited to providing an indication that there is a surveillance device in the immediate area, and insufficient information is developed to pinpoint its location. Thus, it usually is necessary to conduct a thorough search of the area to locate the device, commonly referred to as a "bug".

SUMMARY OF THE INVENTION

The present invention is an accessory which is utilized in association with commercially available bug detectors of the type comprising radio receivers which detect the carrier (or sub-carrier) frequency of the transmitter portion of a bugging device and demodulate any information which is modulating the carrier (or sub-carrier). The invention includes an acoustic generator for producing a single pulse which is picked up by the bug and is transmitted as modulated electromagnetic energy. The generation of the acoustic pulse also is accompanied by the development of an electrical pulse which is used internally of the accessory to actuate a timing arrangement which measures the time between the generations of the acoustic pulse and its return to the accessory as a demodulated electrical signal. Since the time involved for the acoustic pulse to be converted to electromagnetic energy and returned to the accessory is negligible as compared with the time for the acoustic pulse to travel from the accessory to the bug, the time measured by the timing arrangement essentially is a function of the range of the accessory from the bug. By operating the timing arrangement at a speed which is a function of that of the acoustic pulse through an air medium, and utilizing a display device in association with the timer, the display provides an indication of the distance between the bug and the accessory.

The invention will be described in further detail with reference to the accompanying drawings wherein:

FIG. 1 is a block diagram illustrating the communication network within which the present invention operates; and FIG. 2 is a block diagram illustrating the arrangement of the various components which comprise the invention.

DETAILED DESCRIPTION OF THE INVENTION

Figure 1:
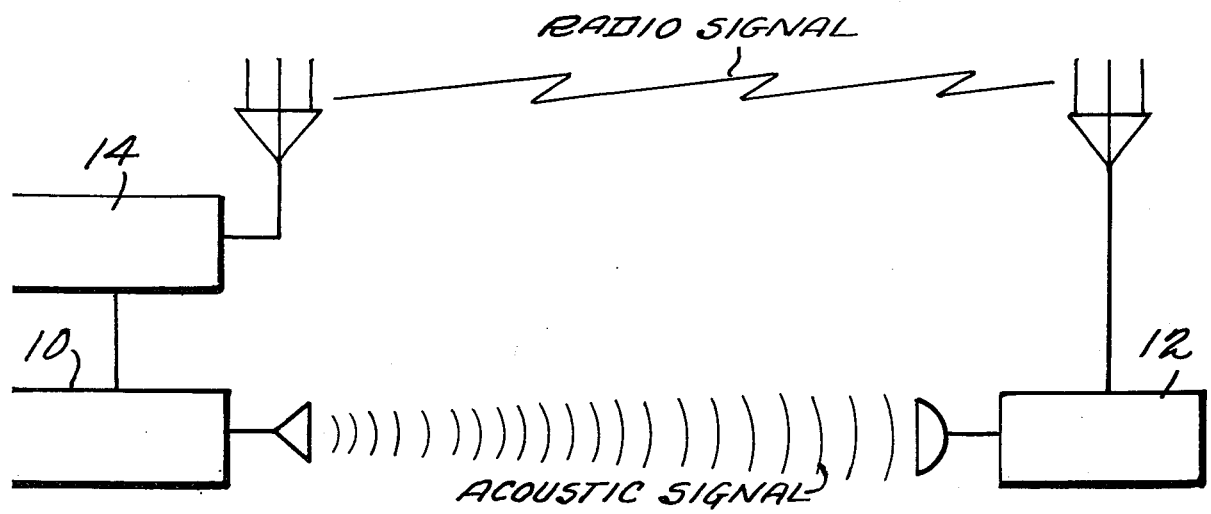
Figure 2:
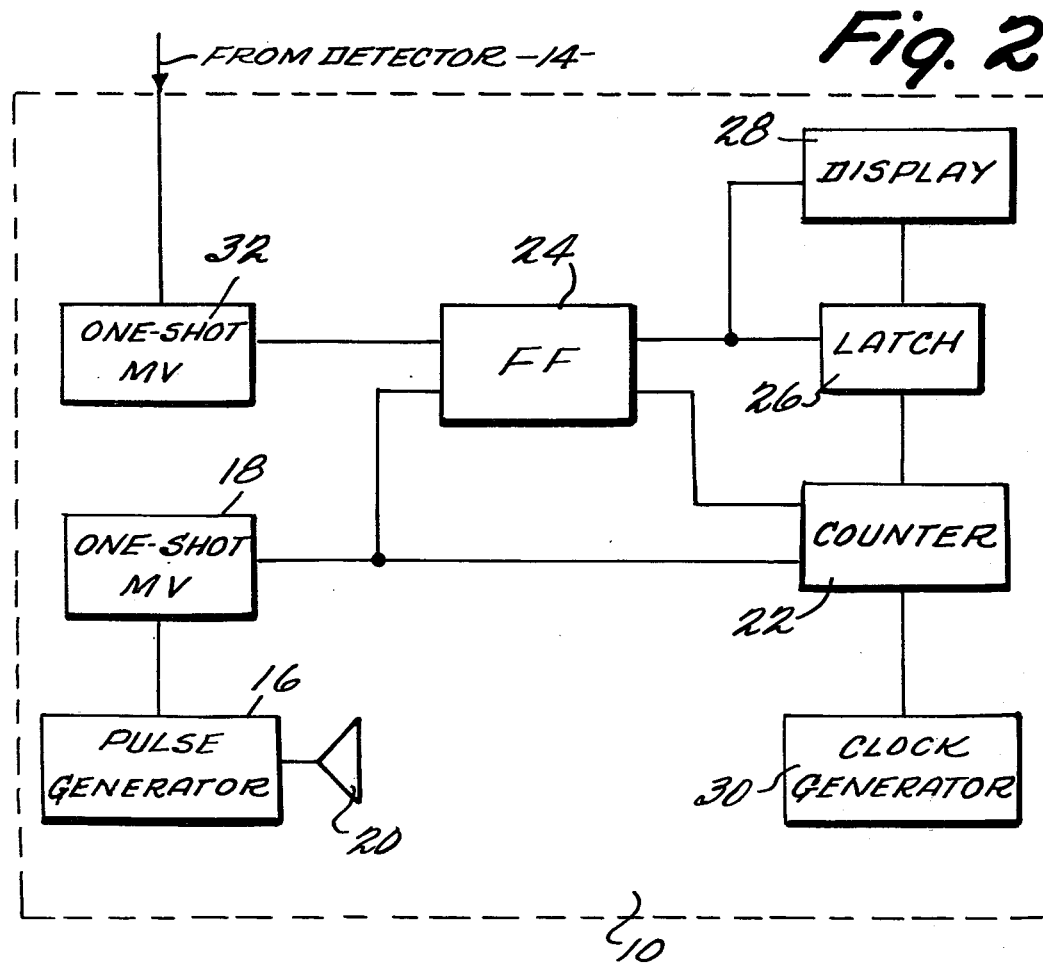

Referring first to FIG. 1 of the drawings, the circuit arrangement according to the invention, generally indicated by the numeral 10, generates a single acoustic pulse which is picked up by the transmitter portion 12 of a bug and is transmitted as a modulated electromagnetic signal. This signal is received and demodulated by a known bug detector 14, much as the SCANLOCK MARK V marketed by Technical Services Agency of Fort Washington, Maryland. Typically this type of device performs a scanning function to detect the carrier (or sub-carrier) frequency of a local transmitter and after locking onto this frequency, it demodulates any signal carried thereby. The circuit arrangement 10 is connected to the detector 14 as an accessory whereby the demodulated signal representative of the originally transmitted acoustic pulse is supplied as an input to the circuitry 10 which now will be described in detail with reference to FIG. 2.

The circuitry arrangement 10 comprises a pulse generator 16 for selectively generating a single electrical pulse which is applied to a conventional one-shot multivibrator 18 and to the coil of a speaker 20. The energization of the speaker coil results in a single acoustic pulse being produced by the speaker which is propagated through the air so as to be picked up and retransmitted as an electromagnetic signal, as previously described.

Energization of multivibrator 18 by the pulse from generator 16 produces an output pulse from the multivibrator which resets a counter 22 to zero and which is applied as an input to a flip-flop 24. A first output line from the flip-flop is connected to the input of the counter 22, and a second output line from flip-flop 24 is connected to the inputs of a latch circuit 26 and a display device 28. The counter 22, latch 26 and display 28 may be combined as a single package, such as the Type TIL 306 circuit manufactured by Texas Instruments Incorporated. This circuit combines a seven-segment light emitting diode with a BCD counter, a four bit latch and a decoder/LED driver so as to provide a numeric display with associated logic. In response to an output from multivibrator 18, the state of flip-flop 24 is set so that the following functions occur: the counter 22 is permitted to begin counting the pulses received from a clock generator 30; the latch 26 follows the data counted by the counter; and the display 28 is blanked.

A further one-shot multivibrator 32 is connected to the output of detector 14. When the detector demodulates the transmission received from transmitter 12 to produce an electrical signal representative of the single pulse originally propagated from speaker 20, the signal energizes multivibrator 32 to produce an output which is applied to a second input line of flip-flop 24 to reverse its state thus changing the voltage levels on the output lines of the flip-flop. As a result, the operation of the counter and the latch is stopped, and the display is unblanked to provide a readout of the information which has been stored in the latch.

By appropriate calibration, the information which is displayed constitutes a direct reading of the distance of circuitry 10 from the transmitter 12 of the bug. More particularly, assuming a speed of sound through air of 1100 feet per second, the time required for sound to travel one foot is approximately 0.0009 second. With electrical pulses being produced by clock generator 30 at a rate of one pulse per 0.0009 second (i.e. about 1100 pulses per second), the count indicated on display 28 represents a readout in feet of the distance to the bug. Since the time involved for the acoustic pulse to be returned to the detector 14 as an electromagnetic signal is negligible in comparison with the time of transmittal of the pulse from speaker 20 to the bug's transmitter 12, the return time essentially is ignored by the circuitry 10.

In operation, when the presence of a bug within an area is determined by the conventional detector device (as, for example, the aforesaid SCANLOCK MARK V), the pulse generator 16 is actuated to produce the single acoustic pulse which is propagated in order to produce a first readout on display 28. Once the operator knows the distance to the bug he visually attempts to determine from his position the likely direction to the bug's precise location. However, if such deductive analysis is not possible or correct, the operator moves with circuitry 10 to a different position and repeats the ranging operation just described. With two or more readings of distance to the bug from known locations, its exact position clearly is defined.

What is claimed is:

1. A device for use in conjunction with a detector of covert audio surveillance apparatus, said apparatus being of the type which secretively senses information in the audio frequency range and which includes a covert transmitter portion for generating electromagnetic signals modulated by said information, said detector demodulating the electromagnetic signals to develop an output pulse, said device comprising:
   means capable of producing a discrete acoustic monopulse, signal and for propagating said signal towards said transmitter portion;
   means connected to the acoustic signal producing means and operative when an acoustic signal is produced to commence a timing sequence;
   means responsive to said output pulse, developed by the detector when said acoustic signal is secretively sensed by the covert audio surveillance apparatus and is transmitted as a modulated electromagnetic signal from said covert transmitter portion, for terminating said timing sequence; and
   means operative as a function of the time elapsed between the commencement and termination of the timing sequence to provide an indication of the distance between the transmitter and said device.

2. A device as set forth in claim 1, wherein said distance indicating means comprises:
   a clock generator for producing a train of pulses;
   a counter operative during said timing sequence for counting the number of pulses produced by said clock generator; and
   means for displaying the number of pulses counted by said counter during said timing sequence.

3. A device as set forth in claim 2 wherein said clock generator produces a train of pulses at a frequency corresponding to the speed of propagation of the acoustic signal.

4. A device as set forth in claim 2, wherein said means for commencing a timing sequence comprises:
   means for resetting said counter to zero and for clearing the display of the pulse count obtained during a previous timing sequence.

5. A device as set forth in claim 2, wherein said means for terminating a timing sequence comprises:
   means for stopping the operation of said counter and for enabling the display means.

6. A device for use in conjunction with a detector of covert audio surveillance apparatus, said apparatus being of the type which secretively senses information in the audio frequency range and which includes a covert transmitter portion for generating electromagnetic signals modulated by said information, said detector demodulating the electromagnetic signals to develop an output pulse, said device comprising:
   means capable of producing a discrete acoustic signal and for propagating said signal towards said transmitter portion;
   a clock generator for producing a train of pulses;
   a counter joined to said clock generator for counting the number of pulses produced by said clock generator;
   means connected to the acoustic signal producing means and operative when an acoustic signal is produced for resetting said counter to zero;
   means joined to said counter for displaying the number of pulses counted by said counter;
   means joined to said counter and the displaying means, and responsive to said output pulse developed by the detector when said acoustic signal is secretive sensed by the covert audio surveillance apparatus and is transmitted as a modulated electromagnetic signal from said covert transmitter portion, for stopping the operation of said counter and for enabling the display means to display the number of pulses counted between the time of resetting and stopping of the counter.

7. A device as set forth in claim 6, wherein said clock generator produces a train of pulses at a frequency corresponding to the speed of propagation of the acoustic signal whereby the displayed count when the counter is stopped is representative of the distance between the covert transmitter portion and said device.

* * * * *